United States Patent [19]
Cha et al.

[11] Patent Number: 5,517,173
[45] Date of Patent: May 14, 1996

[54] APPARATUS GENERATING NOISE SOUND FOR ELECTRIC CAR

[75] Inventors: Young-Whan Cha; Hyun-Soo Ahan, both of Kyungnam, Rep. of Korea

[73] Assignee: Samsung Heavy Industry Co., Ltd., Rep. of Korea

[21] Appl. No.: 233,860

[22] Filed: Apr. 26, 1994

[30] Foreign Application Priority Data

Jun. 30, 1993 [KR] Rep. of Korea ............... 1993-11934
Jun. 30, 1993 [KR] Rep. of Korea ............... 1993-11935

[51] Int. Cl.⁶ ............................................. G08B 3/00
[52] U.S. Cl. ........................ 340/404.1; 340/404.2; 340/404.3; 181/0.5; 381/86
[58] Field of Search ............... 340/404.1–404.3; 181/0.5, 175, 177, 215, 230; 381/86, 87, 153–156, 158

[56] References Cited

U.S. PATENT DOCUMENTS

| | | | |
|---|---|---|---|
| 1,761,162 | 6/1930 | Volf, Jr. ................... | 340/404.2 |
| 1,828,608 | 10/1931 | Mack ...................... | 340/404.2 |
| 3,516,384 | 6/1970 | Will ....................... | 340/404.3 |
| 4,393,374 | 7/1983 | Bandelj ................... | 340/404.2 |

Primary Examiner—Donnie L. Crosland
Attorney, Agent, or Firm—Lieberman & Nowak

[57] ABSTRACT

An apparatus for generating a noise sound, which is equipped in industrial electric cars with little or no driving sound and generates an appropriate amount of noise sound so that the nearby cars or pedestrians can notice their approch in a narrow pathway or stock room. The apparatus has a cornical air collector installed in the car, a shutter installed rotatably in the air collector and controls the flow amount of air passing through the air collector, and a U-shaped tube installed apart by a predetermined distance from a small diameter portion of the air collector and generates the noise sound by the air discharged from the air collector.

4 Claims, 1 Drawing Sheet

APPARATUS GENERATING NOISE SOUND FOR ELECTRIC CAR

BACKGROUND OF THE INVENTION

1. Field of the invention

The present invention relates to an apparatus generating a noise sound for an electric car(hereinafter, referred to as "noise sound generator"), and particularly to an apparatus which is equipped in industrial electric cars with little or no driving sound and generates an appropriate mount of noise sound so that the nearby cars or pedestrians can notice their approch in a narrow pathway or stock room.

2. Description of the prior arts

The conventional industrial car or other cars driven by electricity produce little or no driving sound while driving. Accordingly, drivers of the nearby cars and pedestrians often can not notice the approaching electric car, causing a dangerous situation or an accident to occur.

On the other hand, the approach of car is generally noticed by a horn sound. However, the horn causes not only considerable amount of noise, but unpleasant feeling to other car drivers and pedestrians. Particularly, since the use of the horn is more restricted in an indoor space of the stockroom or the narrow pathway, the accidents can happen frequently unless the drivers are very wary of driving.

SUMMARY OF THE INVENTION

It is an object of the present invention to provide a noise sound generator for an electric car which generates an appropriate loudness of noise sound so that nearby cars or pedestrians can notice the approach thereof, thus preventing accidents in advance.

It is another object of the present invention to provide a noise sound generator for an electric car which can avoid the loud noise and the unpleasant environment due to the use of the horn.

In order to achieve the above objects, there is provided a noise sound generator for a car driven by an electrical motor, comprising a means for generating a predetermined amount of alarm sound by a driver's operation, thereby the approach of the car is noticed to nearby cars or a pedestrians.

According to one aspect of the present invention, said means comprises a conical air collector, a shutter installed rotatably in said air collector and controls the flow amount of air passing through said air collector, and a U-shaped tube installed apart by a predetermined distance from a small diameter portion of said air collector and generates the noise sound by the air discharged from said air collector.

According to another aspect of the present invention, said means comprises a current amplifier connected to an output port of an accelerator pedal which supplies a proportional driving signal current to said electrical motor, a buzzer connected to an output port of said current amplifier, and an ON/OFF switch which supplies power to said current amplifier by the driver's operation. Thus, when the accelerator pedal is operated and the switch is ON, the buzzer generates a predetermined amount of an alarm sound.

DETAILED DESCRIPTION OF THE PREFERRED EMBODIMENTS

Figure 1:
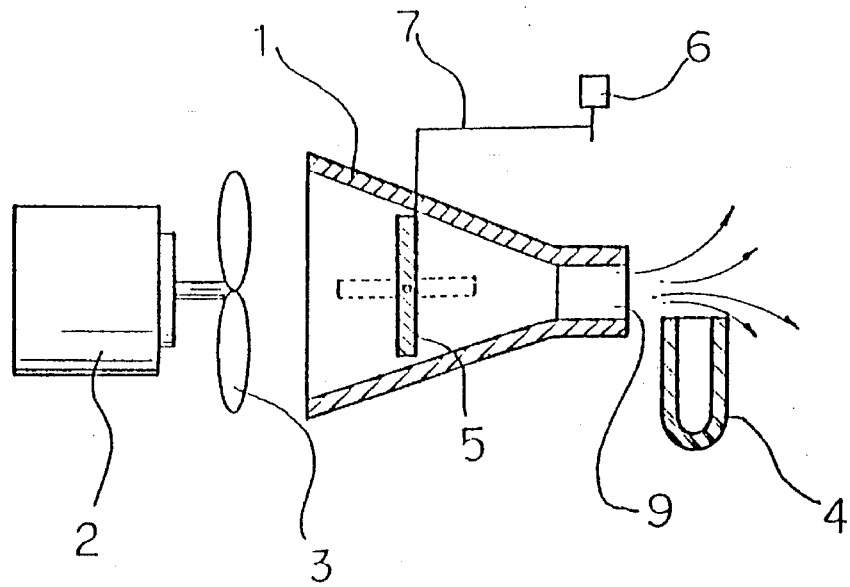
FIG. 1 is a schematic diagram of a noise sound generator according to an example of the present invention

FIG. 1 shows a schematic diagram of a noise sound generator according to an example of the present invention.

As shown in FIG. 1, a conical air collector 1 is installed at a predetermined position of a car. The larger diameter portion 8 of air collector 1 is toward the forward direction of the car, so that the wind generated by driving the car can flow into the inside of air collector 1.

In the inside of air collector 1, a rotatable shutter 5 is installed in order to control the passing mount of wind. The shutter 5 is connected to a cable 7 and a shutter control lever 6, and the openning size of shutter 5 is controlled by the operation of control lever 6.

In addition, U-shaped tube 4 is installed at a predetermined distance apart from the small diameter portion 9 of air collector 1. A noise is generated due to a Venturi effect as the discharged wind from air collector 1 passes by the upper surface of U-shaped tube 4. Such a noise can be modulated in various ways depending on the shape of U-shape tube 4.

On the other hand, as described in the above, the wind can be generated by installing a motor 2 driven fan 3 in front of the larger diameter portion 8 of air collector 1. In this case, the larger diameter portion 8 of air collector 1 is not necessarilly toward the forward direction of the car.

According to the noise sound generator of this example, if the shutter 5 is placed in the open position(i.e., dotted line in FIG. 1) by the operation of the control lever 6, the natural wind or the forced wind generated by fan 3 flow into the inside of air collector 1 through the larger diameter portion 8 of air collector 1, and then discharge out through the small diameter portion 9 of air collector 1. Since the discharged wind causes an appropriate noise sound due to the Venturi effect as it passes by the upper surface of U-shaped tube 4, nearby cars or pedestrians can notice the approch of the car by this noise sound.

Also, the drivers can adjust the loudness of the noise sound by operating the control lever 6 which controls the openning size of shutter 5.

Figure 2:
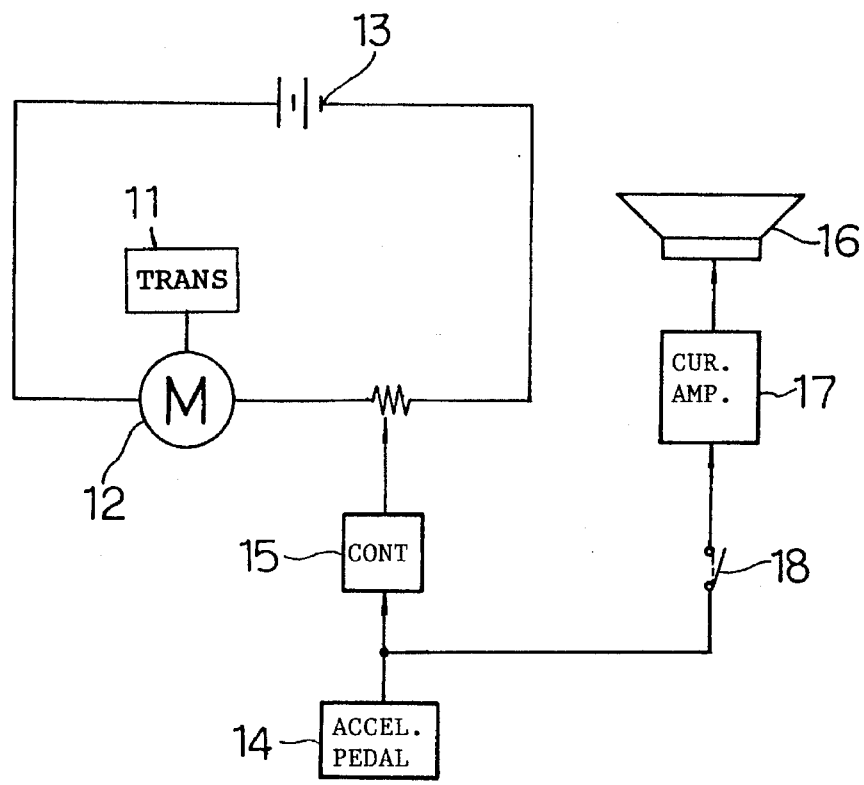
FIG. 2 is a schematic diagram of a noise sound generator according to another example of the present invention

FIG. 2 shows a schematic diagram of a noise sound generator according to another example of the present invention.

As shown in FIG. 2, an electric motor 12 which is operated by the supplied current from a battery 13 is employed to drive a power transmission 11 of a car. The rotation speed of electric motor 12 is variably controlled by the a controller 15 and an accelerator pedal 14 connected thereto.

In addition, a current amplifier 17 is connected to the output port of the accelerator pedal 14 which is again connected to a buzzer 16. A switch 18 for connecting and disconnecting the power which is supplied to buzzer 16 is installed near the driver's seat.

According to the noise sound generator of this example, when a noise sound is needed to be generated while driving(e.g., in a narrow space or a stock room), the operation power is applied to buzzer 16 through current amplifier 17 from battery 13 by turning on switch 18. At this time, buzzer 16 generates an appropriate buzzer sound, giving notice to nearby cars or pedestrians of the car approaching. Also, when it is not needed to generate the noise sound, switch 18 is turned off.

As described in the above, the noise sound generator of the present invention is equipped in an electric car with little or no driving sound and generates an appropriately loud noise sound when necessary, giving notice of the car approaching to nearby cars, pedestrians and workers and thereby preventing various accidents by the electric car from occurring in advance.

Also, since the noise sound generator of the present invention can give notice of the car approaching without using the horn in the narrow space or stock room, it can effectively avoid the loud noise and unpleasant environment due to the use of the horn.

What is claimed is:

1. An apparatus for generating a sound for a car driven by an electric motor to alert other cars or pedestrians to the approach of said car, said sound generating means comprising:
   a conical air collector mounted in said car, said air collector having a larger diameter portion and a smaller diameter portion;
   a shutter means rotatably disposed in said air collector to control the amount of air passing through said air collector; and
   a U-shaped tube disposed a predetermined distance apart from the smaller diameter portion of said air collector and generating sound by the action of the air discharged from the air collector.

2. The apparatus of claim 1, wherein said sound generating means is installed with the larger diameter of said air collector toward the forward direction of said car.

3. The apparatus of claim 1, wherein said sound generating means further comprises:
   a motor driven fan installed in front of the larger diameter portion of said air collector.

4. An apparatus for generating a sound for a car driven by an electric motor under the control of an accelerator pedal, to alert other cars or pedestrians to the approach of said car, said sound generating means comprising:
   an output port on said accelerator pedal for generating a signal to said electric motor which is proportional to a desired driving speed;
   a current amplifier connected to an output port of said accelerator pedal;
   a buzzer connected to said current amplifier; and
   on/off switch means for powering said current amplifier, said switch means being operable by the driver of the car whereby said sound is generated.

* * * * *